United States Patent
Imai

(10) Patent No.: US 7,486,312 B2
(45) Date of Patent: Feb. 3, 2009

(54) BRIGHTNESS CORRECTION FOR IMAGE

(75) Inventor: Toshie Imai, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 979 days.

(21) Appl. No.: 10/845,769

(22) Filed: May 14, 2004

(65) Prior Publication Data
US 2005/0036033 A1    Feb. 17, 2005

(30) Foreign Application Priority Data
May 16, 2003 (JP) ............................. 2003-138574

(51) Int. Cl.
*H04N 5/228* (2006.01)
(52) U.S. Cl. .................................. 348/222.1
(58) Field of Classification Search ....................... None
See application file for complete search history.

(56) References Cited

U.S. PATENT DOCUMENTS

| | | | |
|---|---|---|---|
| 6,694,051 B1 * | 2/2004 | Yamazoe et al. | 382/167 |
| 6,845,181 B2 * | 1/2005 | Dupin et al. | 382/274 |
| 6,873,729 B2 * | 3/2005 | Matsushima et al. | 382/167 |

FOREIGN PATENT DOCUMENTS

| JP | 10-079885 | 3/1998 |
|---|---|---|
| JP | 11-120325 | 4/1999 |

OTHER PUBLICATIONS

Abstract of Japanese Patent Publication No. 10-079885, Pub. Date: Mar. 24, 1998, Patent Abstracts of Japan.
Abstract of Japanese Patent Publication No. 11-120325, Pub. Date: Apr. 30, 1999, Patent Abstracts of Japan.

* cited by examiner

*Primary Examiner*—Justin P Misleh
(74) *Attorney, Agent, or Firm*—Martine Penilla & Gencarella, LLP

(57) ABSTRACT

A CPU 200 determines whether or not a picked up image that corresponds to image data is a backlit portrait image by analyzing the image data on a pixel-by-pixel basis, and if the picked up image that corresponds to the image data is determined to be a backlit portrait image, then executes a brightness correction for backlit portrait image. The CPU 200 obtains a tone curve that may have an output value of a predetermined value FV as an output value in response to an input value of a flesh-colored pixel average luminance value PV ave, which is an average luminance value of flesh-colored pixels of all pixels that constitute the image data. The CPU 200 applies the tone curve to the luminance of every pixel in the image data and thereby executes the brightness correction.

7 Claims, 4 Drawing Sheets

BRIGHTNESS CORRECTION FOR IMAGE

BACKGROUND OF THE INVENTION

1. Field of the Invention

The present invention relates to an image processing device and an image processing method for executing brightness adjustments of image data, which being digital data of a picked up image.

2. Description of the Related Art

A variety of image processing techniques are proposed and in practical use for image data generated by devices such as digital still cameras (DSCs). In these image processing techniques, a variety of image processing (so-called automatic image quality adjustment) such as contrast correction, brightness correction, and saturation correction are executed on image data based on predefined correction conditions such as contrast correction, brightness correction, and saturation correction selected by users or on results of analyses on the image data.

However, the conventional image processing techniques are still facing with a problem that no satisfactory image can be obtained from portrait image data that has undergone a brightness adjustment, in particular, from portrait image data that was picked up against light.

SUMMARY OF THE INVENTION

The purpose of the present invention is to solve the above-mentioned problem and to make a suitable brightness adjustment on a portrait image that was picked up against light.

In order to solve the above-mentioned problem, a first aspect of the present invention provides an image processing device that executes image processing of image data, which being digital data of image. The image processing device of the first aspect of the present invention is characterized in comprising: an image data acquisition module that acquires the image data; an image determination module that determines whether or not the image data is image data that corresponds to a backlit portrait image by analyzing the image data; a flesh-colored pixel average luminance value calculation module that calculates an average luminance value of flesh-colored pixels in the image data by analyzing the image data; and a brightness adjustment module that, if the image is determined to be a backlit portrait image, then executes a brightness adjustment of the image data by using the flesh-colored pixel average luminance value and a predetermined value.

According to the image processing device of the present invention, if the image data is determined to be image data that corresponds to a backlit portrait image as a result of the analysis on the image data, the brightness adjustment of the image data is then executed by using the flesh-colored pixel average luminance value and the predetermined value. In this way, the brightness adjustment can be executed in a way suitable for a portrait image that was picked up against light. In other words, with the use of the flesh-colored pixel average luminance value, the brightness adjustment can be executed with good reproducibility with respect to the flesh-colored pixels.

In the image processing device of the first aspect of the present invention, the brightness adjustment may be executed by using a linear characteristic line that determines output values from input values, the linear characteristic line being a tone curve that is characterized in having an output value of the predetermined value in response to an input value of the flesh-colored pixel average luminance value. In such a case, the application of the flesh-colored pixel average luminance value to the tone curve may result in the output of the predetermined value (brightness adjusted). In this way, the brightness (luminance) that is suitable for the flesh-colored pixels can be used as the predetermined value and therefore brightness of the flesh-colored components can be adjusted as appropriate. Therefore, the luminance (brightness) of the flesh color in the backlit portrait image can be adjusted without damaging the reproducibility of the preferable flesh color.

In the image processing device of the first aspect of the present invention, the tone curve can be expressed by the following equation.

$$\text{Output Value} = 255 \times (\text{Input Value}/255)^\gamma$$

The value of $\gamma$ in the above equation may be a value for the case in which the flesh-colored pixel average luminance value is used as an input value and the predetermined value is used as an output value.

In the image processing device of the first aspect of the present invention, the tone curve may be a tone curve with respect to the luminance or may be a tone curve with respect to each component R, G, or B. The brightness of the image data can be adjusted through the adjustment of the luminance. The brightness of the image data can also be adjusted through the application of the tone curve to each of the components R, G, and B.

In the image processing device of the first aspect of the present invention, if the image is determined not to be a backlit portrait image, the brightness adjustment module may then execute the brightness adjustment of the image data by using a bright luminance value and a dark luminance value, which may be obtained from a luminance distribution characteristic of the image data and a predetermined percentage value to the total number of pixels in the image data. In such a case, by not focusing on the flesh-colored pixels, the brightness adjustment can be executed in a way suitable for generally picked up images.

A second aspect of the present invention provides an image processing method for image data, which being digital data of a picked up image. The image processing method of the second aspect of the present invention may comprise the steps of: acquiring the image data; determining whether or not the picked up image that corresponds to the acquired image data is a backlit portrait image by analyzing the image data; calculating an average luminance value of flesh-colored pixels in the image data by analyzing the image data; and if the image is determined to be a backlit portrait image, then executing a brightness adjustment of the image data by using the flesh-colored pixel average luminance value and a predetermined value.

According to the image processing method of the second aspect of the present invention, the similar functions and effects as the image processing device of the first aspect of the present invention can be obtained. In addition, the image processing method of the second aspect of the present invention may also be actualized in a variety of aspects in a way similar to the image processing device of the first aspect of the processing device.

The image processing device of the first aspect of the present invention and the image processing method of the second aspect of the present invention may also be actualized as an image processing program and a recording medium in which the image processing program is stored.

DETAILED DESCRIPTION OF THE PREFERRED EMBODIMENTS

The following describes an image processing device of the present invention based on examples and with reference to drawings.

Figure 1:
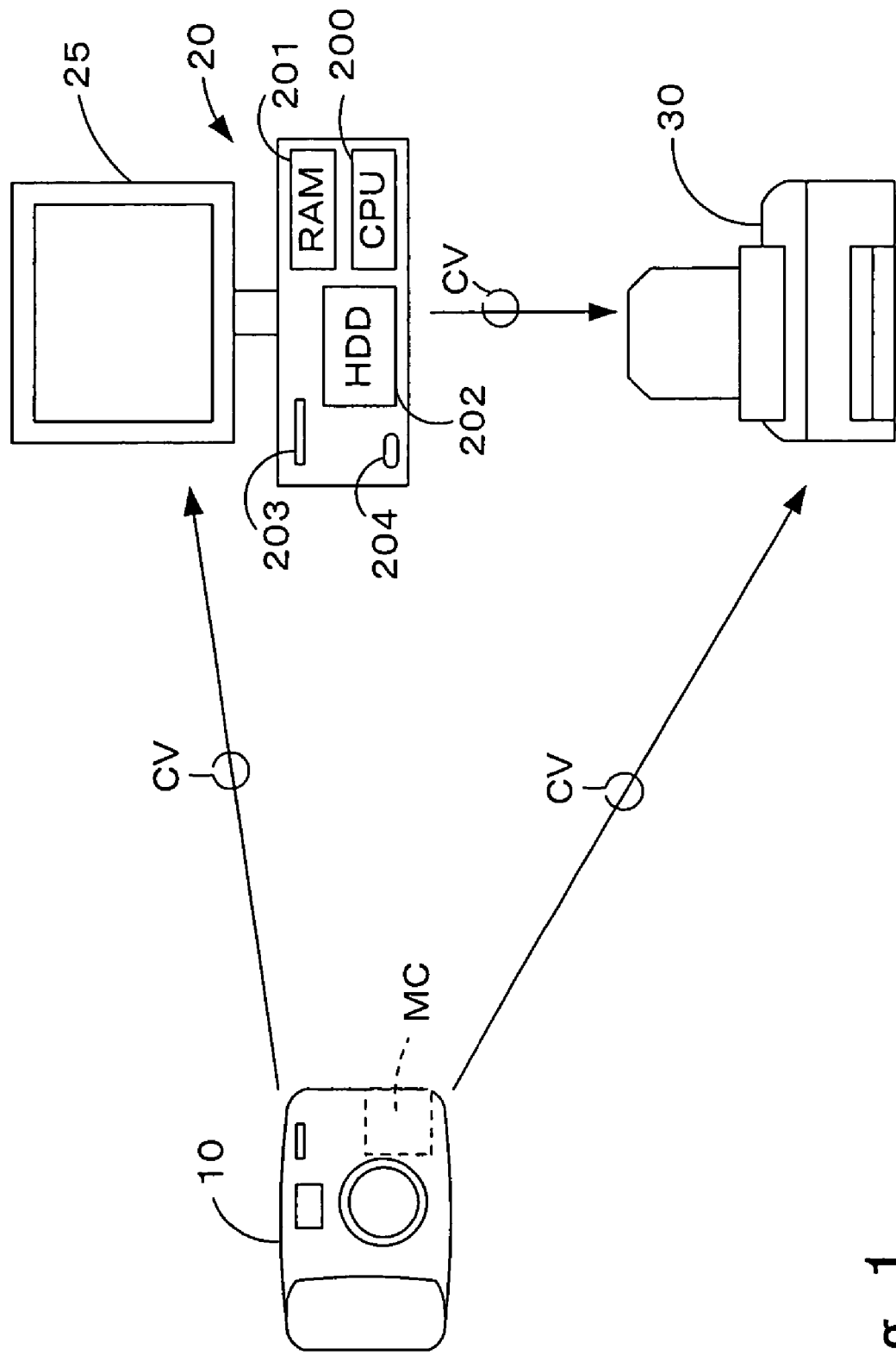
FIG. 1 is a schematic that shows an example of an image processing system, which includes a personal computer as an image processing device of the present embodiment.

A. Arrangement of Image Processing System:

An arrangement of an image processing system, to which an image processing device of a first embodiment can be applied, will now be described with reference to FIG. 1. FIG. 1 is a schematic diagram that shows an example of an image processing system, which includes a personal computer as an image processing device of the present embodiment.

The image processing system includes: a digital still camera 10 as an input device that generates image data; a personal computer 20 as an image processing device that executes image processing based on the image data generated by the digital still camera 10 and outputs image data for printing; and a color printer 30 as an output device that outputs an image by using the image data for printing. The color printer 30 may also have the function of image processing, which is of the personal computer PC. In such a case, the color printer 30 can execute both the image processing and the image output in a stand-alone mode. As the output device, other devices such as a monitor (e.g. CRT display or LCD display) and a projector may also be used as well instead of the printer 30. In the following description, however, the color printer 30 in connection with the personal computer 20 is used as the output device.

The personal computer 20 is a generally used type of computer that includes: a CPU 200 that includes an image determination module, flesh-colored pixel average luminance calculation module, and brightness adjustment module, and executes image processing programs of the present invention: a RAM 201 that temporally stores data such as a result of operation from the CPU 200 and image data; and a hard disc drive (HDD) 202 that stores the image processing programs. The personal computer 20 also includes: a card slot 203 for receiving a memory card MC; and an input/output terminal 204 for receiving a connecting cable from the digital still camera 10 or the like.

The digital still camera 10 is a camera that acquires an image by focusing optical information onto a digital device (a CCD or a photomultiplier) and includes: a photoelectric conversion circuit that has a CCD or the like for converting the optical information into electrical information; an image acquisition circuit for acquiring an image by controlling the photoelectric conversion circuit; and an image processing circuit for processing the acquired digital image. The digital still camera 10 saves the acquired image as digital data into the memory card MC as a storage device. Although the digital still camera 10 generally employs JPEG data format as a lossy compression saving mode and TIFF data format as a lossless compression saving mode, other saving modes may also be used as well, including RAW data format, GIF data format, and BMP data format, for example.

The image data generated in the digital still camera 10 is transmitted to the color printer 30 via a cable CV and the computer 20 or directly via a cable CV, for example. The mage data may alternatively be transmitted to the color printer 30 by connecting the memory card MC, in which the image data from the digital still camera is stored, to the card slot 203 on the computer 20 or directly to the printer 30. The following describes a case where the personal computer 20 executes the image processing of the image data and then outputs the processed image data to the color printer 30.

The color printer 30 is a printer that is capable of outputting color images. For example, the color printer 30 is an inkjet printer that forms images by spouting four colors of inks, i.e. cyan (C), magenta (M), yellow (Y), and black (K) onto printing media to form dot patterns. The color printer 30 may alternatively be an electro-photographic printer that forms images by transferring and fixing color toners onto printing media. As for the color inks, light cyan (LC), light magenta (LM), and dark yellow (DY) may also be used as well as the afore-mentioned four colors.

Figure 2:
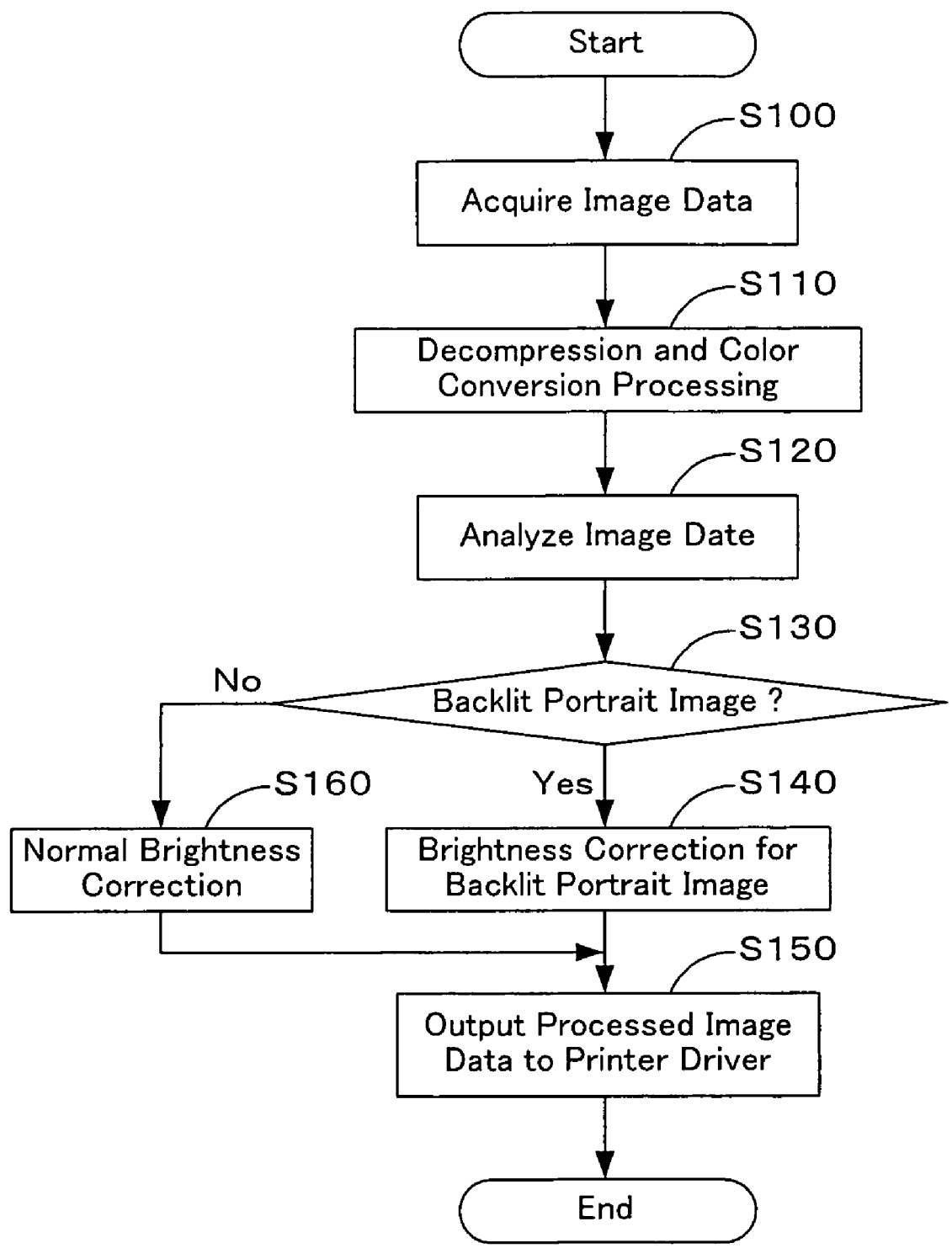
FIG. 2 is a flowchart that shows a processing routine of the image processing that is executed by the personal computer in the present embodiment.
Figure 3:
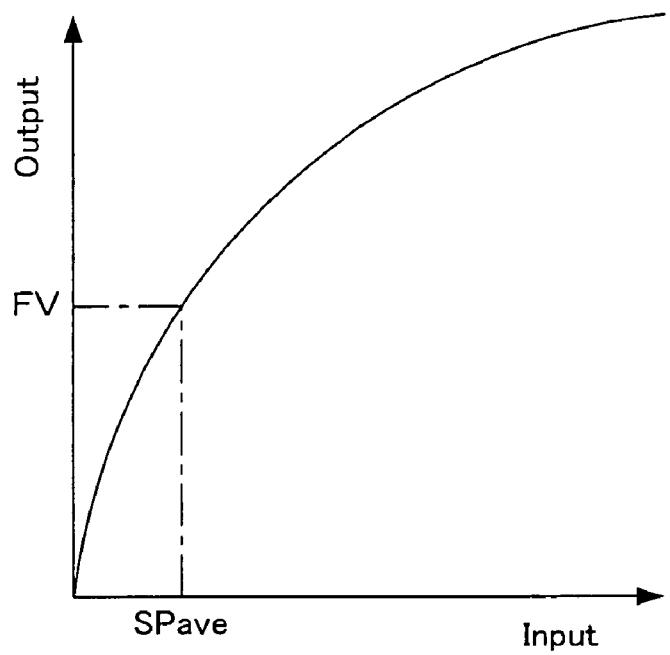
FIG. 3 is a schematic that shows an example of a tone curve that is used for the image processing in the present embodiment.
Figure 4:
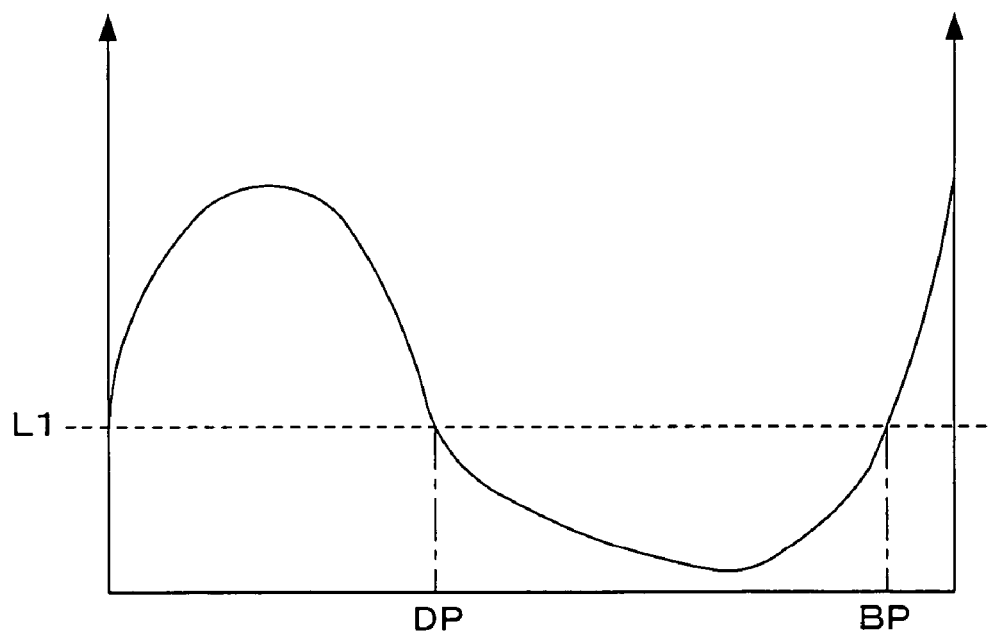
FIG. 4 is a chart of luminance distribution that is used in determining whether or not image data is data of a backlit portrait image.
Figure 5:
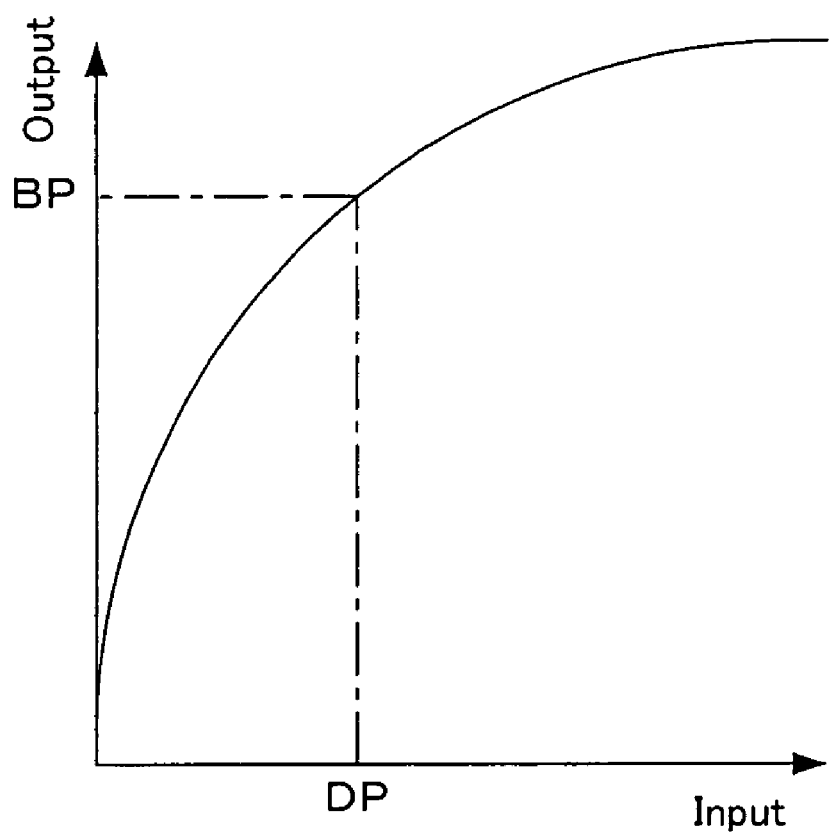
FIG. 5 is a schematic that shows a tone curve that is used in normal image processing, which has been executed conventionally.

B. Image Processing Executed in Personal Computer 20:

The following describes image processing that is executed in the personal computer 20 with reference to FIGS. 2 to 5. FIG. 2 is a flowchart that shows a processing routine of image processing that is executed by the personal computer in the present embodiment. FIG. 3 is a schematic that shows an example of a tone curve that is used for the image processing in the present embodiment. FIG. 4 is a chart of luminance distribution that is used in determining whether or not image data is data of a backlit portrait image. FIG. 5 is a schematic that shows a tone curve that is used in normal image processing, which has been executed conventionally.

When the memory card MC is inserted into the card slot 203 or when the connecting cable CV that connects to the digital still camera 10 is connected to the input/output terminal 204, the personal computer 20 (CPU 200) activates a program for the present image processing. The CPU 200 acquires (reads) image data out of the memory card MC under user's instructions and temporarily stores the acquired image data into the RAM 201 (step S100).

The CPU 200 then executes decompression and color conversion processing of the image data (step S110). Specifically, the CPU 200 decompresses the image data GD and subsequently uses a matrix S to execute a matrix operation on the decompressed image data GD, thereby completing YCbCr to RGB color conversion processing.

The image data that is used in the present embodiment is stored in the form of JPEG image data or compressed YCbCr data. On the other hand, RGB data is generally used for the execution of image processing in current personal computers PCs and printers. This is why the decompression (decoding) of JPEG data and the color conversion processing from YCbCr data to RGB data are required. The matrix S is a matrix that is generally used for the conversion from YCbCr data to RGB data in the JFIF standard and is well-known to persons skilled in the art. A detail of the matrix is thus not described herein.

Next, the CPU 200 analyzes the converted image data or the RGB data on a pixel-by-pixel basis (step S120) and determines whether or not the picked up image that corresponds to the image data is a backlit portrait image (step S130). Specifically, the CPU 200 analyzes the image data to generate the chart of luminance value distribution, which is with respect to the pixels that constitute the image data and is shown in FIG. 4, and then compares the generated luminance value distribution with a criterion luminance value distribution, which is with respect to image data of a backlit portrait image and is previously stored in the HDD 202, to make the determination. Since a backlit portrait image can be grouped broadly into a bright background and a dark subject (portrait), the luminance value distribution of a backlit portrait image (image data) is characteristic of having two peaks, i.e. one at the darker luminance area and the other at the brighter luminance area. If the luminance value distribution that was obtained from the analyzed image data has a distribution characteristic similar to the luminance value distribution of a backlit portrait image, the picked up image is then determined to be a backlit portrait image.

If the picked up image that corresponds to the image data is determined to be a backlit portrait image (Yes returned in step S130), the CPU 200 then executes brightness correction for backlit portrait image (step S140). Specifically, the CPU 200 acquires a flesh-colored pixel average luminance value PBave, i.e. an average luminance value of flesh-colored pixels of all pixels that constitute the image data, and obtains a linear characteristic line that may have an output value of a predetermined value FV that is previously stored in the HDD 202, e.g. 128, in response to an input value of the flesh-colored pixel average luminance value PB. The tone curve shown in FIG. 3 can thus be obtained. As for the flesh-colored pixels, every pixel having a combination of R value, G value, and B value within a predetermined range is determined to be a flesh-colored pixel. The predetermined value FV is an empirically obtained value that allows the flesh color to be specified by suitable luminance or brightness in the output image.

Although the tone curve has been described with reference to the schematic for ease of understanding, the actual tone curve (linear characteristic line) is represented by the following equation (1), and the calculation of a coefficient $\gamma$ is performed by using the flesh-colored pixel average luminance value SPave as an input value and the predetermined value FV as an output value. Therefore, the tone curve is also referred to as a gamma curve.

$$\text{Output Value} = 255 \times (\text{Input Value}/255)^\gamma$$

The CPU 200 applies the equation (1) to the luminance value of each pixel in the image data and executes the brightness correction (obtains the output luminance value from the input luminance value). Alternatively, the CPU 200 may apply the equation (1) to the R value, G value, and B value of each pixel in the image data and thereby executes the brightness correction.

The CPU 200 outputs the image data that has undergone the brightness correction to a printer driver (step S150) and thereby ends the present processing routine. The printer driver executes color conversion processing from the image data (RGB data) into CMYK data. In other words, the printer driver converts the color system of the image data into a CMYK color system, i.e. a color system that is used by the color printer 20 for the execution of print processing. Specifically, the color conversion processing is executed by using a look up table that is stored in the HDD 202 (ROM) and defines the correspondence between the RGB color system and the CMYK color system. The image data also undergoes halftone processing and resolution conversion processing, and is output to the color printer 30 in the form of raster data for printing.

If the picked up image that corresponds to the image data is determined not to be a backlit portrait image (No returned in step S130), the CPU 200 then executes normal brightness correction (step S160), outputs the image data that has undergone the normal brightness correction to a printer driver (step S150), and thereby ends the present processing routine. The following describes the details of the normal brightness correction. The CPU 200 uses the previously generated luminance value distribution (see FIG. 4) with respect to the pixels that constitute the image data to obtain a dark luminance value DP and a bright luminance value BP at the intersection of the luminance value distribution curve with a line of predetermined percentage to the total number of pixels, e.g. with a 10 percentage line (L1). The CPU 200 then obtains a tone curve that may have the dark luminance value DP as an input value and the bright luminance value BP as an output value BP, as shown in FIG. 5. Since the equation (1) is used to represent the linear characteristic line and the tone curve is obtained in a way similar to the brightness correction for backlit portrait image, neither the equation nor the way to obtain the tone curve are described again. The CPU 200 uses the obtained tone curve to execute the brightness correction of the luminance value of each pixel in the image data.

As described above, according to the image processing device and the image processing method of the present embodiment, the average luminance value of the flesh-colored pixel components SPave in the image data and the predetermined value FV are used for the execution of the brightness adjustment for image data of backlit portrait image. This allows the brightness adjustment to be executed in a way suitable for a backlit portrait image. That is to say, if the predetermined value FV is set equal to a luminance value that is preferable for the flesh-colored pixels, e.g. 128, a tone curve that may output the predetermined value FV=128 in response to the input of the flesh-colored pixel average luminance value SPave is obtained, and the obtained tone curve is then used to adjust the brightness of the image data. This allows the brightness of the flesh-colored pixels in the unprocessed image data to be converted into preferable brightness.

Particularly in a backlit portrait image, since flesh-colored pixels that correspond to a portrait have lower (darker) brightness, the brightness of each pixel in image data requires improvement in order to represent the portrait with clarity. In order to meet this demand, conventional techniques determined an amount of brightness correction (amount of adjustment) by using a luminance distribution, which was generated by sampling all pixels in the image data. The amount of brightness correction, which was determined by sampling all the pixels in the image data, however, is not a suitable amount of brightness correction for the flesh-colored pixels. In this way, outputting an image based on the image data that has undergone the brightness correction could not reproduce the preferable flesh color.

In the present embodiment, however, an amount of brightness correction for a backlit portrait image data is determined by sampling flesh-colored pixels only, as described above. In this way, the luminance (brightness) of flesh color in a backlit portrait image can be adjusted without damaging the reproducibility of the preferable flesh color.

Other Embodiments:

Although the personal computer 20 is used as the image processing device and executes the image processing in the above-described embodiment, other devices may alternatively be used as the image processing device. Examples of such alternative devices include a stand-alone type printer with the function of image processing. In such a case, the image processing is executed by the printer. Alternatively, the image processing may also be implemented as a printer driver or an image processing application (program) without accompanying any hardware configuration such as the image processing device.

Although only the brightness adjustment is described for the clarity of features of the present embodiment in the above-mentioned embodiments, it goes without saying that the personal computer 20 may execute various adjustments such as contrast adjustment and color adjustment as well as the brightness adjustment. In such a case, the CPU 200 analyzes the image data on a pixel-by-pixel basis and thereby acquires various characteristic parameter values, for example, image statistics such as minimum luminance, a maximum luminance, and representative brightness value. The CPU 200 determines an amount of correction for each of the parameters such that the difference between a predefined reference value that is stored in the HDD 202 with respect to the corresponding characteristic parameter and the image statistic that was obtained by the analysis can be eliminated or reduced, and thereby corrects RGB values of the image data. The correction of the image data is then executed by applying the determined amounts of correction to a tone curve, which defines the relationship of output values to input values, and then by using the corrected tone curve to modify the RGB values of each pixel in the image data.

Although the image processing device, the image processing method, and the image processing program of the present invention have been described above in terms of embodiments, these embodiments are only purposed to facilitate understanding of the present invention and are not considered to limit the present invention. There may be various changes, modifications, and equivalents without departing from the scope or spirit of the claims of the present invention.

What is claimed is:

1. An image processing device that executes image processing of image data, the image data being digital data of an image, the image processing device comprising:
    an image data acquisition module that acquires the image data;
    an image determination module that determines whether the image data is image data that conesponds to a backlit portrait image by analyzing the image data;
    a flesh-colored pixel average luminance value calculation module that calculates an average luminance value of flesh-colored pixels in the image data by analyzing the image and
    a brightness adjustment module that, if the image is determined to be a backlit portrait image, then executes a brightness adjustment of the image data by using the flesh-colored pixel average luminance value and a predetermined value,
    wherein the brightness adjustment by the brightness adjustment module is executed by using a linear characteristic line that determines output values from input values, the linear characteristic line being a tone curve that is characterized in having an output value of the predetermined value in response to an input value of the flesh-colored pixel average luminance value.

2. An image processing device according to claim 1, wherein the tone curve is represented by the equation:

Output Value=255×(Input Value/255)$^\gamma$, where the value of $\gamma$ in the above equation is a value for a case in which the flesh-colored pixel average luminance value is used as an input value and the predetermined value is used as an output value.

3. An image processing device according to claim 1 or claim 2, wherein the tone curve is a tone curve with respect to the luminance.

4. An image processing device according to claim 1 or claim 2, wherein the tone curve is a tone curve with respect to each component R, G, or B.

5. An image processing device according to claim 1, wherein if the image is determined not to be a backlit portrait image, the brightness adjustment module then executes the brightness adjustment of the image data by using a bright luminance value and a dark luminance value, the bright luminance value and the dark luminance value being obtained from a luminance distribution characteristic of the image data and a predetermined percentage value to the total number of pixels in the image data.

6. An image processing method for image data, the image data being digital data of a picked up image, the image processing method comprising:
    acquiring the image data;
    determining whether the picked up image that conesponds to the acquired image data is a backlit portrait image by analyzing the image data;
    calculating an average luminance value of flesh-colored pixels in the image data by analyzing the image data; and
    if the image is determined to be a backlit portrait image, then executing a brightness adjustment of the image data by using the flesh-colored pixel average luminance value and a predetermined value,
    wherein the brightness adjustment is executed by using a linear characteristic line that determines output values from input values, the linear characteristic line being a tone curve that is characterized in having an output value of the predetermined value in response to an input value of the flesh-colored pixel average luminance value.

7. An image processing method according to claim 6, wherein the tone curve is expressed by the equation:

Output Value=255×(Input Value/255)$^\gamma$, where the value of $\gamma$ in the above equation is a value for the case in which the flesh-colored pixel average luminance value is used as an input value and the predetermined value is used as an output value.

* * * * *